(12) United States Patent
Ballard et al.

(10) Patent No.: US 12,397,407 B2
(45) Date of Patent: *Aug. 26, 2025

(54) HYDRAULIC TOOL HAVING RAM PISTON WITH INTEGRATED OVERLOAD ASSEMBLY

(71) Applicant: Milwaukee Electric Tool Corporation, Brookfield, WI (US)

(72) Inventors: James G. Ballard, Waukesha, WI (US); James O. Myrhum, Jr., West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,408

(22) Filed: May 21, 2024

(65) Prior Publication Data

US 2024/0308047 A1     Sep. 19, 2024

Related U.S. Application Data

(63) Continuation of application No. 17/051,396, filed as application No. PCT/US2020/048357 on Aug. 28, 2020, now Pat. No. 11,999,042.

(Continued)

(51) Int. Cl.
*B25F 5/00* (2006.01)
*F15B 15/14* (2006.01)
(Continued)

(52) U.S. Cl.
CPC ............... *B25F 5/005* (2013.01); *B25F 5/00* (2013.01); *F15B 15/1447* (2013.01);
(Continued)

(58) Field of Classification Search
CPC . B25F 5/00; B25F 5/005; B23D 17/06; B23D 29/002; F15B 15/1447;
(Continued)

(56) References Cited

U.S. PATENT DOCUMENTS 2,353,254 A     7/1944 McCandless
3,155,271 A    11/1964 Summers et al.
(Continued)

FOREIGN PATENT DOCUMENTS

CN     106949274 A    7/2017
EP       2187066 A1   5/2010
WO    2015/061425 A1   4/2015

*Primary Examiner* — Scott A Smith
(74) *Attorney, Agent, or Firm* — Quarles & Brady LLP (57) ABSTRACT

Embodiments of the invention provide a ram assembly for a hydraulic tool. The ram assembly includes a ram piston having a ram cavity. The ram piston receives a hydraulic pressure reaction force. The ram assembly further includes an overload assembly disposed in the ram cavity or in a cavity defined by a manifold. The overload assembly includes a burst disc positioned at a first end of the ram cavity or manifold, a lock nut positioned at a second end of the ram cavity or manifold, and a spacer positioned between the burst disc and the lock nut. The spacer transfers a supporting force applied to the lock nut to the burst disc. The hydraulic pressure reaction force and the supporting force both act in the same direction, and thus, are additive forces acting on the burst disk.

20 Claims, 7 Drawing Sheets

Related U.S. Application Data (60) Provisional application No. 62/893,607, filed on Aug. 29, 2019.

(51) Int. Cl.
*F16K 17/16* (2006.01)
*B23D 17/06* (2006.01)
*B23D 29/00* (2006.01)
*F16K 17/38* (2006.01)

(52) U.S. Cl.
CPC .......... *F16K 17/162* (2013.01); *B23D 17/06* (2013.01); *B23D 29/002* (2013.01); *F16K 17/16* (2013.01); *F16K 17/383* (2013.01)

(58) Field of Classification Search
CPC .......... F15B 15/20; F15B 20/00; F16K 17/16; F16K 17/1606; F16K 17/1613; F16K 17/162; F16K 17/1626; F16K 17/383
USPC ........ 173/218; 137/68.12, 68.24, 69, 71, 72, 137/79; 72/407
See application file for complete search history.

(56) References Cited

U.S. PATENT DOCUMENTS

| | | |
|---|---|---|
| 3,383,963 A | 5/1968 | Vondrachek |
| 3,559,668 A | 2/1971 | Crossman |
| 3,908,684 A | 9/1975 | Short |
| 4,064,890 A | 12/1977 | Collins, Jr. et al. |
| 4,206,603 A | 6/1980 | Mekler |
| 4,590,957 A | 5/1986 | McFarlane |
| 4,750,510 A | 6/1988 | Short, III |
| 5,048,554 A | 9/1991 | Kremer |
| 5,213,128 A | 5/1993 | Baird |
| 5,647,390 A | 7/1997 | Wass |
| 5,836,400 A | 11/1998 | Tupper et al. |
| 5,884,540 A | 3/1999 | Mo |
| 5,961,521 A | 10/1999 | Roger et al. |
| 6,230,733 B1 | 5/2001 | Strelow et al. |
| 6,401,515 B2 | 6/2002 | Frenken |
| 6,769,356 B2 | 8/2004 | Frenken |
| 7,254,982 B2 | 8/2007 | Frenken |
| 7,533,556 B2 | 5/2009 | Lefavour et al. |
| 7,788,962 B2 | 9/2010 | Chiasson et al. |
| 7,814,827 B2 | 10/2010 | Frenken et al. |
| 7,937,838 B2 | 5/2011 | Patton |
| 7,954,742 B2 | 6/2011 | Ramun et al. |
| 8,251,157 B2 | 8/2012 | Gray et al. |
| 8,266,991 B2 | 9/2012 | Thorson et al. |
| 8,316,549 B2 | 11/2012 | Musser |
| 8,327,868 B2 | 12/2012 | Lammers |
| 8,683,704 B2 | 4/2014 | Scott et al. |
| 8,763,257 B2 | 7/2014 | Thorson et al. |
| 8,844,436 B2 | 9/2014 | Frenken |
| 8,851,200 B2 | 10/2014 | Gray et al. |
| 8,875,404 B2 | 11/2014 | Scott et al. |
| 8,925,567 B2 | 1/2015 | Schulze |
| 8,966,691 B2 | 3/2015 | Richards |
| 9,016,317 B2 | 4/2015 | Myrhum, Jr. |
| 9,196,881 B2 | 11/2015 | Gray et al. |
| 9,302,402 B2 | 4/2016 | Thorson et al. |
| 9,448,051 B2 | 9/2016 | Morrison et al. |
| 9,484,700 B2 | 11/2016 | Kehoe |
| 9,486,864 B2 | 11/2016 | Luo et al. |
| 9,486,865 B2 | 11/2016 | Scott et al. |
| 9,669,533 B2 | 6/2017 | Myrhum, Jr. |
| 9,722,334 B2 | 8/2017 | Sterling et al. |
| 9,808,851 B2 | 11/2017 | Thorson et al. |
| 9,822,805 B2 | 11/2017 | De Gier |
| D805,365 S | 12/2017 | Ballard et al. |
| 9,873,187 B2 | 1/2018 | Bungler |
| 9,960,509 B2 | 5/2018 | Sterling et al. |
| 9,993,885 B2 | 6/2018 | Frenken |
| 10,046,470 B2 | 8/2018 | Thorson et al. |
| 10,058,989 B2 | 8/2018 | Chellen |
| 10,093,012 B2 | 10/2018 | Koski et al. |
| 10,128,723 B2 | 11/2018 | Mergener et al. |
| 10,213,821 B2 | 2/2019 | Thorson et al. |
| 10,226,826 B2 | 3/2019 | Kehoe et al. |
| 10,228,069 B2 | 3/2019 | Wilson et al. |
| 10,265,758 B2 | 4/2019 | Skinner et al. |
| 10,270,263 B2 | 4/2019 | Brozek |
| 10,312,653 B2 | 6/2019 | Ballard et al. |
| 10,339,496 B2 | 7/2019 | Matson et al. |
| 10,343,266 B2 | 7/2019 | Theiler et al. |
| 10,380,883 B2 | 8/2019 | Matson et al. |
| 10,385,983 B2 | 8/2019 | Ligeti |
| 10,428,843 B2 | 10/2019 | Ballard et al. |
| D866,623 S | 11/2019 | Fenske |
| 10,498,195 B2 | 12/2019 | Mergener et al. |
| D878,435 S | 3/2020 | Fenske |
| 10,576,557 B2 | 3/2020 | Fenske |
| 10,618,151 B2 | 4/2020 | Kanack et al. |
| 10,700,575 B2 | 6/2020 | Hessenberger et al. |
| 11,999,042 B2 * | 6/2024 | Ballard .................. B25F 5/005 |
| 2005/0011236 A1 | 1/2005 | Frenken et al. |
| 2007/0003392 A1 | 1/2007 | Frenken et al. |
| 2008/0069663 A1 | 3/2008 | Frenken et al. |
| 2009/0229842 A1 | 9/2009 | Gray et al. |
| 2010/0088898 A1 | 4/2010 | Thorson et al. |
| 2010/0325894 A1 | 12/2010 | Scott et al. |
| 2011/0005083 A1 | 1/2011 | Scott et al. |
| 2011/0005084 A1 | 1/2011 | Thorson et al. |
| 2011/0266834 A1 | 11/2011 | Beumer et al. |
| 2012/0318546 A1 | 12/2012 | Gray et al. |
| 2013/0008031 A1 | 1/2013 | Thorson et al. |
| 2013/0097873 A1 | 4/2013 | Luo et al. |
| 2014/0034159 A1 | 2/2014 | Myrhum, Jr. |
| 2014/0173907 A1 | 6/2014 | Scott et al. |
| 2014/0182137 A1 | 7/2014 | Liu et al. |
| 2015/0014008 A1 | 1/2015 | Gray et al. |
| 2015/0217438 A1 | 8/2015 | Myrhum, Jr. |
| 2016/0099533 A1 | 4/2016 | Kehoe |
| 2016/0214265 A1 | 7/2016 | Thorson et al. |
| 2016/0252112 A1 | 9/2016 | Kehoe et al. |
| 2016/0288193 A1 | 10/2016 | Thorson et al. |
| 2016/0329674 A1 | 11/2016 | Ballard et al. |
| 2016/0363510 A1 | 12/2016 | Kanack et al. |
| 2016/0364687 A1 | 12/2016 | Matson et al. |
| 2016/0373457 A1 | 12/2016 | Matson et al. |
| 2017/0013740 A1 | 1/2017 | Mergener et al. |
| 2017/0271893 A1 | 9/2017 | Brozek |
| 2017/0350027 A1 | 12/2017 | Belbachir et al. |
| 2017/0355027 A1 | 12/2017 | D'Antuono |
| 2017/0356472 A1 | 12/2017 | Ballard et al. |
| 2018/0021840 A1 | 1/2018 | Thorson et al. |
| 2018/0085903 A1 | 3/2018 | Wackwitz et al. |
| 2018/0085909 A1 | 3/2018 | Koski et al. |
| 2018/0093319 A1 | 4/2018 | Skinner et al. |
| 2018/0099388 A1 | 4/2018 | Koski et al. |
| 2018/0147618 A1 | 5/2018 | Skinner et al. |
| 2018/0281272 A1 | 10/2018 | Dickert et al. |
| 2018/0311805 A1 | 11/2018 | Koski et al. |
| 2018/0326600 A1 | 11/2018 | Wason et al. |
| 2019/0052149 A1 | 2/2019 | Mergener et al. |
| 2019/0151967 A1 | 5/2019 | Kehoe et al. |
| 2019/0156278 A1 | 5/2019 | Matson et al. |
| 2019/0176207 A1 | 6/2019 | Thorson et al. |
| 2019/0232481 A1 | 8/2019 | Skinner et al. |
| 2019/0260266 A1 | 8/2019 | Hessenberger et al. |
| 2019/0318616 A1 | 10/2019 | Matson et al. |
| 2020/0001446 A1 | 1/2020 | Ballard et al. |
| 2020/0055130 A1 | 2/2020 | D'Antuono et al. |
| 2020/0061854 A1 | 2/2020 | D'Antuono |
| 2020/0070262 A1 | 3/2020 | D'Antuono |
| 2020/0070263 A1 | 3/2020 | Olbrich |
| 2020/0147771 A1 | 5/2020 | Mergener et al. |
| 2020/0180128 A1 | 6/2020 | Schneider et al. |
| 2020/0238487 A1 | 7/2020 | Kanack et al. |
| 2020/0261959 A1 | 8/2020 | Wekwert et al. |
| 2020/0266684 A1 | 8/2020 | Hessenberger et al. |

* cited by examiner

HYDRAULIC TOOL HAVING RAM PISTON WITH INTEGRATED OVERLOAD ASSEMBLY

RELATED APPLICATIONS

The present application is a continuation of U.S. patent application Ser. No. 17/051,396, filed Oct. 28, 2020, now U.S. Pat. No. 11,999,042, which represents the national stage entry of International Application No. PCT/US2020/048357, filed Aug. 28, 2020, which claims priority to U.S. Provisional Application No. 62/893,607, filed Aug. 29, 2019, entitled "Hydraulic Tool Having Ram Piston Design with Integrated Overload Assembly," the content of which is incorporated herein by reference in its entirety.

BACKGROUND

Hydraulic crimpers and cutters are different types of hydraulic power tools, such as portable, handheld hydraulic tools, for performing work (e.g., crimping or cutting) on a work piece. A hydraulic pump pressurizes hydraulic fluid and transfers it to a cylinder in the tool. This cylinder causes an extendible piston to be displaced toward a cutting or crimping head. The piston exerts a force on the head of the power tool, which typically includes opposed jaws with certain cutting or crimping features, depending upon the particular configuration of the power tool. In this case, the force exerted by the piston closes the jaws to perform cutting or crimping on a work piece (e.g., a wire) at a targeted location.

One known hydraulic tool can include an overload assembly configured to burst if the hydraulic tool exceeds a predetermined high-pressure set point. In normal operation, when the hydraulic tool reaches or exceeds the predetermined high-pressure set point, a load-sensing device of the hydraulic power tool can shut down a motor of the hydraulic tool. If the load-sensing device fails to shut off the motor at the predetermined high-pressure set point, the overload assembly can burst, opening high pressure lines to a reservoir and preventing the hydraulic tool from pressurizing. A typical overload assembly can include a lock nut that is in contact with a spacer, which separates the lock nut from a burst disc (also referred to as a "burst cap") or similar overload device.

There are certain perceived disadvantages of using an assembly such as this, however. For example, during operation of the hydraulic tool, downward movement of the piston pressurizes the hydraulic fluid and forces the hydraulic fluid into the hydraulic fluid passage circuit, causing a reaction force to push on the burst disc, which in turn causes a supporting force from the lock nut to counter the reaction force from the hydraulic pressure. However, because the two forces are in opposite directions, the resulting force that is required to seal the burst disc decreases, which can result in leakage at the burst disc. In order to achieve a significantly larger resulting force, the supporting force on the burst disc must increase, reducing the fatigue life of the burst disc and working against the sealing of the burst disc.

SUMMARY

Embodiments of the invention provide a ram assembly for a hydraulic tool. The ram assembly includes a ram piston having a ram cavity at an end of the ram piston, the ram piston configured to receive a hydraulic pressure reaction force and an overload assembly. The overload assembly can be disposed in the ram cavity. The overload assembly can include a burst disc positioned at a first end of the ram cavity and a lock nut positioned at a second end of the ram cavity, the second end opposite the first end, and configured to receive a supporting force. The hydraulic pressure reaction force and the supporting force can be additive.

In some embodiments, the hydraulic tool can include a manifold that defines a ram chamber having a fluid inlet configured to receive a pressurized hydraulic fluid, a ram assembly having a ram piston disposed within at least a portion of the ram chamber, a burst disc having a peripheral flange, a spacer in contact with the burst disc at the peripheral flange, and a lock nut configured to receive a first force acting in a first direction and a second force acting in the first direction.

Some embodiments of the invention provide a hydraulic tool that can include a manifold defining a ram chamber and a cavity. The cavity can be located along a hydraulic fluid path within the hydraulic tool. The hydraulic tool can include an overload assembly disposed in the cavity defined by the manifold. The overload assembly can include a burst disc positioned at a first end of the cavity, and a lock nut positioned at a second end of the cavity, the second end opposite the first end. During operation of the hydraulic tool, hydraulic pressure can be created in the ram chamber, by which a hydraulic pressure reaction force acts on the lock nut and a supporting force from the lock nut acts on the burst disc so that both the hydraulic pressure reaction force and the supporting force act in the same direction and seal the burst disc against the first end of the cavity.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The overload assembly according to embodiments of the invention can be part of a hydraulic power tool. In one embodiment, the hydraulic power tool can include a cutting or crimping head, an electric motor, a pump driven by the motor, and a housing defining a cylinder. An extendable ram piston can be disposed within the cylinder. The pump can provide pressurized hydraulic fluid through a hydraulic fluid passage circuit to the ram piston, causing the ram piston to extend from the housing to actuate the jaws of the cutting or crimping head for cutting or crimping a work piece, such as a wire. Other power sources can be used to power the tool. Once a work piece or other target is placed between the jaws, the hydraulic power tool can be powered to close the jaws to perform a cutting or crimping action and cut or crimp the work piece or other target.

As discussed above, known hydraulic power tools can include an overload assembly that bursts when the hydraulic tool exceeds a predetermined high-pressure set point, such as when a primary pressure control device (e.g., a pressure transducer) of the hydraulic tool fails to shut off the motor at the predetermined high-pressure set point.

Figure 1:
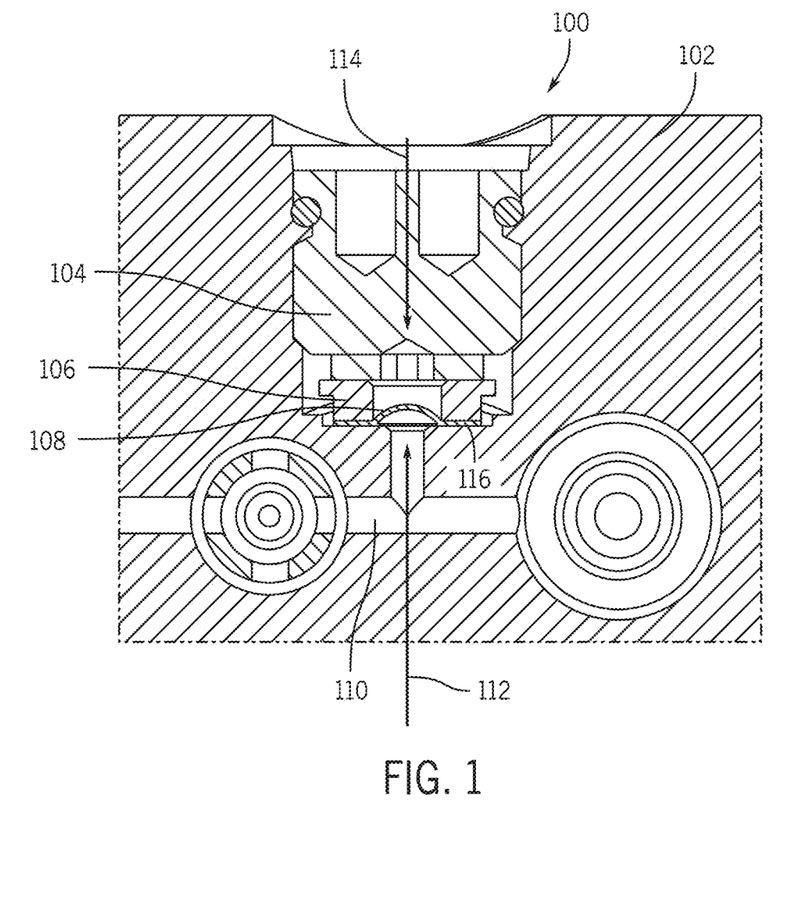
FIG. 1 is a cross-sectional view of an overload assembly that exists in some known hydraulic tools.

FIG. 1 is an example of an overload assembly 100. The overload assembly 100 and its components are housed in a manifold 102. Components of the overload assembly 100 include a lock nut 104, a spacer 106, and a burst disc 108. The overload assembly 100 is positioned proximate to a portion of a hydraulic fluid passage circuit 110. In the overload assembly 100, the lock nut 104 counters a hydraulic pressure reaction force 112 that pushes on the burst disc 108 with a supporting force 114.

An increase in the hydraulic pressure reaction force 112 acting on the burst disc 108 can reduce the sealing force on the burst disc 108 against the mounting surface 116. Additionally, because the supporting force 114 counteracts the hydraulic pressure reaction force 112, an increase in the hydraulic pressure reaction force 112 induces an increase in the supporting force 114 acting on the burst disc 108, causing fatigue of the burst disc 108.

Accordingly, the overload assembly according to embodiments of the invention integrates a burst disc and other overload assembly components into a ram piston of a hydraulic tool, creating forces during operation that are additive instead of opposing. In some embodiments, the overload assembly can be integrated into a manifold of a hydraulic tool so that additive forces are created.

Figure 2:
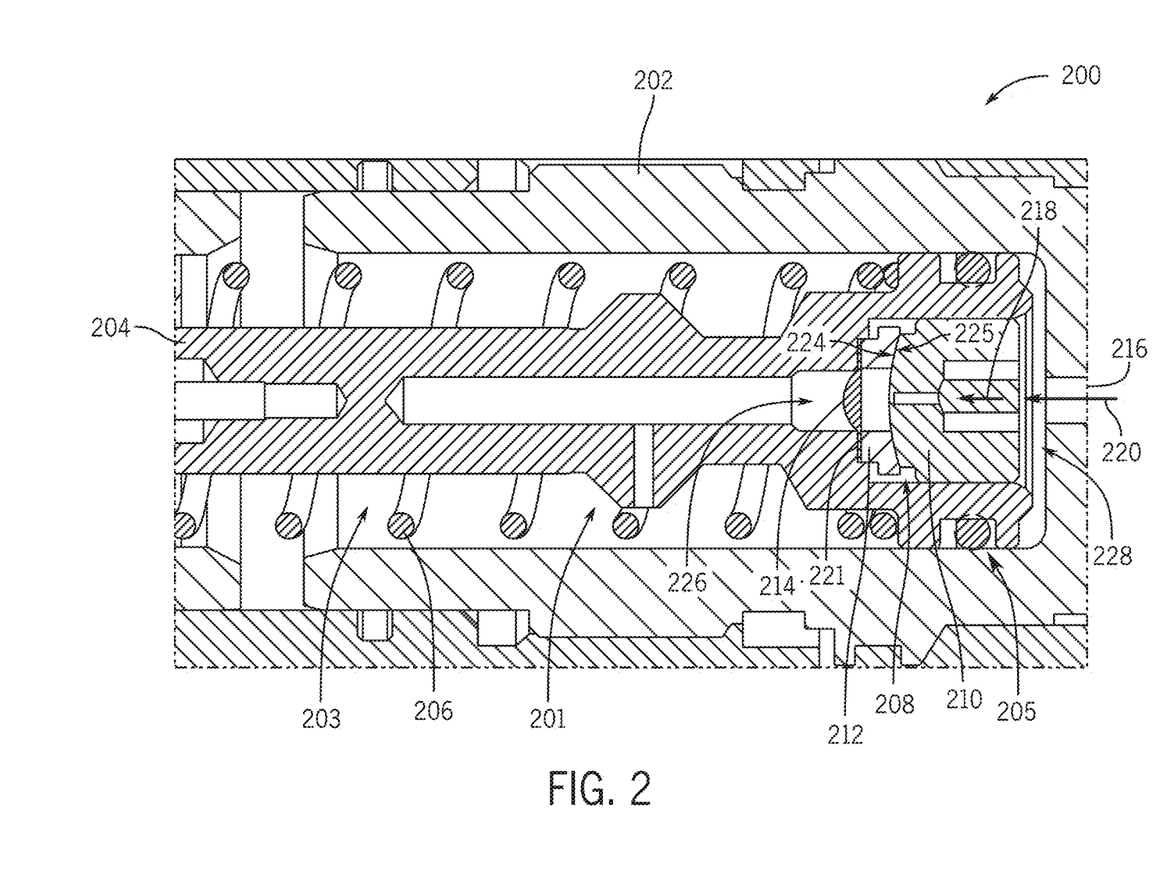
FIG. 2 is a cross-sectional view of an overload assembly according to one embodiment of the invention.

FIG. 2 illustrates an overload assembly 200 according to one embodiment of the invention. The overload assembly 200 can be housed within a manifold 202 defining a ram chamber 201 configured to contain various component parts of a ram assembly, such as a ram piston 204 and a spring 206. More particularly, the overload assembly 200 can be integrated with the ram assembly, namely, with the ram piston 204. For example, one end of the ram piston 204 can include a ram cavity 208 in which a lock nut 210, a spacer 212, and a burst disc 214 can be disposed. In particular, the end of the ram piston 204 that includes the ram cavity 208 can be the end of the ram piston 204 located proximate to a fluid inlet 216 through which the ram chamber 201 is in fluid communication with other portions of the hydraulic fluid passage circuit.

In some embodiments, the spacer 212 includes an aperture 213. In some embodiments, the spacer 212 includes a peripheral flange 215 extending generally radially. Although the spacer 212 is included in the overload assembly 200, alternative embodiments of the overload assembly 200 might not include a spacer. Further, in other embodiments, additional components could be included between lock nut 210 and the burst disc 214 additionally or alternatively to the spacer 212.

The spring 206 can surround an outer surface of the ram piston 204. In some embodiments, the spring 206 can be positioned to extend from a front portion 203 of the ram chamber 201 to a back portion 205 of the ram chamber 201 during cutting or crimping actions. The spring 206 can be affixed at the front portion 203 of the ram chamber 201. In some embodiments, the ram chamber 201 might contain another type of device instead of a spring 206, such as an O-ring, for example.

The lock nut 210 can be configured and arranged so that a supporting force created by the lock nut 210 (i.e., supporting force 218, which is a force generated by the torqueing of the lock nut 210) acts in the same direction as a hydraulic pressure reaction force (i.e., a hydraulic pressure reaction force 220) that pushes on the ram piston 204 (and thus pushes on the lock nut 210).

As shown in FIG. 2, the burst disc 214 is located at the first end 226 of the ram cavity 208, the lock nut 210 is positioned at a second end 228 of the ram cavity 208, opposite the first end 226. In addition, the lock nut 210 can be in threaded contact with an interior surface of the ram cavity 208 or can be coupled to the ram cavity 208 in an alternative manner. Further, the spacer 212 is positioned between the burst disc 214 and the lock nut 210.

Figure 3:
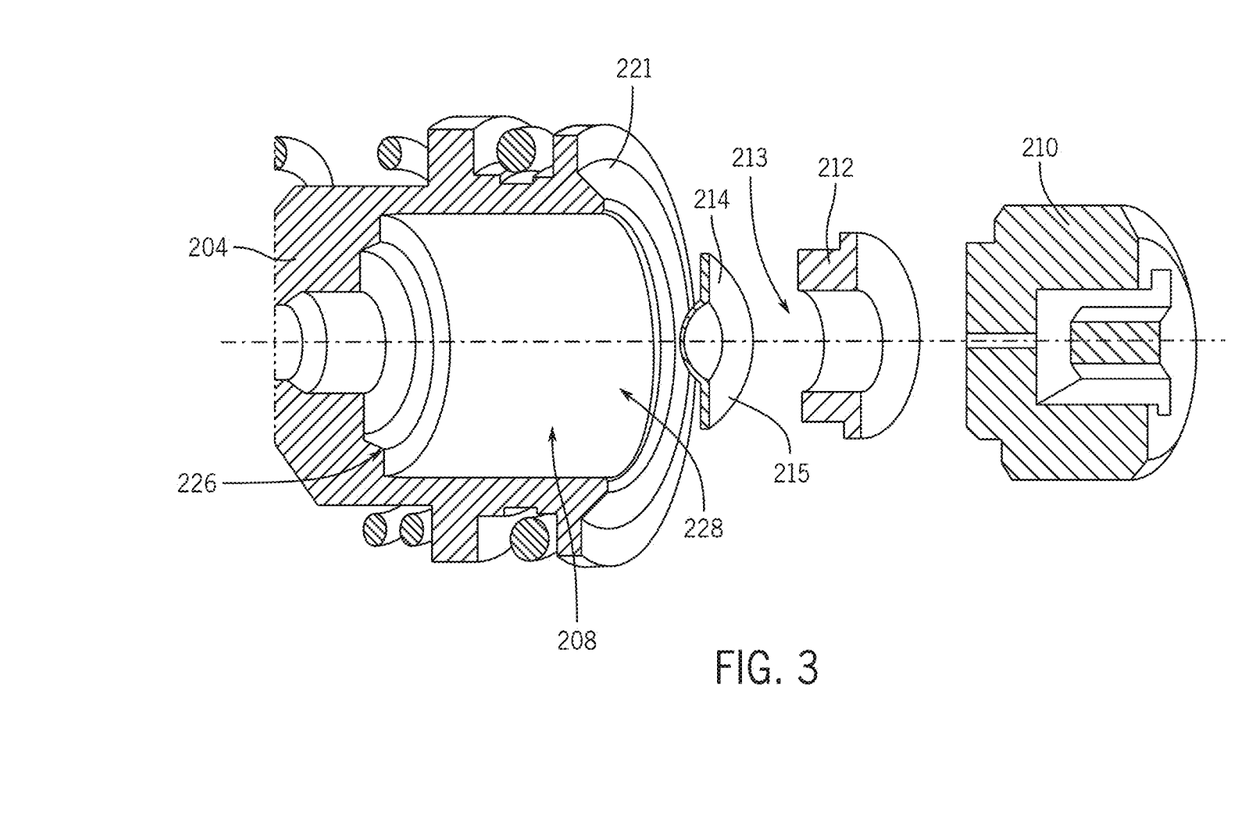
FIG. 3 is an exploded cross-sectional view of a portion of the overload assembly of FIG. 2.

FIG. 3 illustrates a portion of the overload assembly 200 of FIG. 2. In particular, FIG. 3 shows, from left to right, the ram cavity 208 of the ram piston 204, the burst disc 214, the spacer 212, and the lock nut 210. Although no threading or similar structure is shown on an interior surface of the ram cavity 208, some embodiments of the overload assembly 200 can have the lock nut 210 in threaded contact with the interior surface of the ram cavity 208.

In operation of a hydraulic tool that includes the overload assembly 200, hydraulic fluid passes through the fluid inlet 216 and creates hydraulic pressure at the back portion 205 of the ram chamber 201, creating the hydraulic pressure reaction force 220 that facilitates movement of the ram piston 204. Further, the supporting force 218 acts on the burst disc 214 (i.e., by being transmitted by the spacer 212) in the same direction as the hydraulic pressure reaction force 220, as shown in FIG. 2. Since both the supporting force 218 and the hydraulic pressure reaction force 220 are acting in the same direction, the two forces are additive and both act on the burst disc 214. Thus, both forces work to seal the burst disc 214 against a mounting surface of the ram cavity 208 (i.e., mounting surface 221).

Having the overload assembly 200 integrated into the ram piston 204 in this manner can advantageously utilize forces applied during operation of the hydraulic tool to help seal the burst disc 214, even at higher pressures, without causing excessive force to be placed on the burst disc 214. This can advantageously help achieve an improved sealing of the burst disc 214. Since less force is placed on the burst disc 214, the fatigue life of the burst disc 214 can be lengthened.

In alternative embodiments, a similar sealing-assistance effect can be achieved with the overload assembly 200 in alternative locations. Particularly, instead of being integrated in the ram piston 204, the overload assembly 200 can be positioned in the manifold 202 in such a way (e.g., having a particular orientation and location in the manifold 202) that causes the hydraulic pressure reaction force 220 and the supporting force 218 to be additive.

Figure 4:
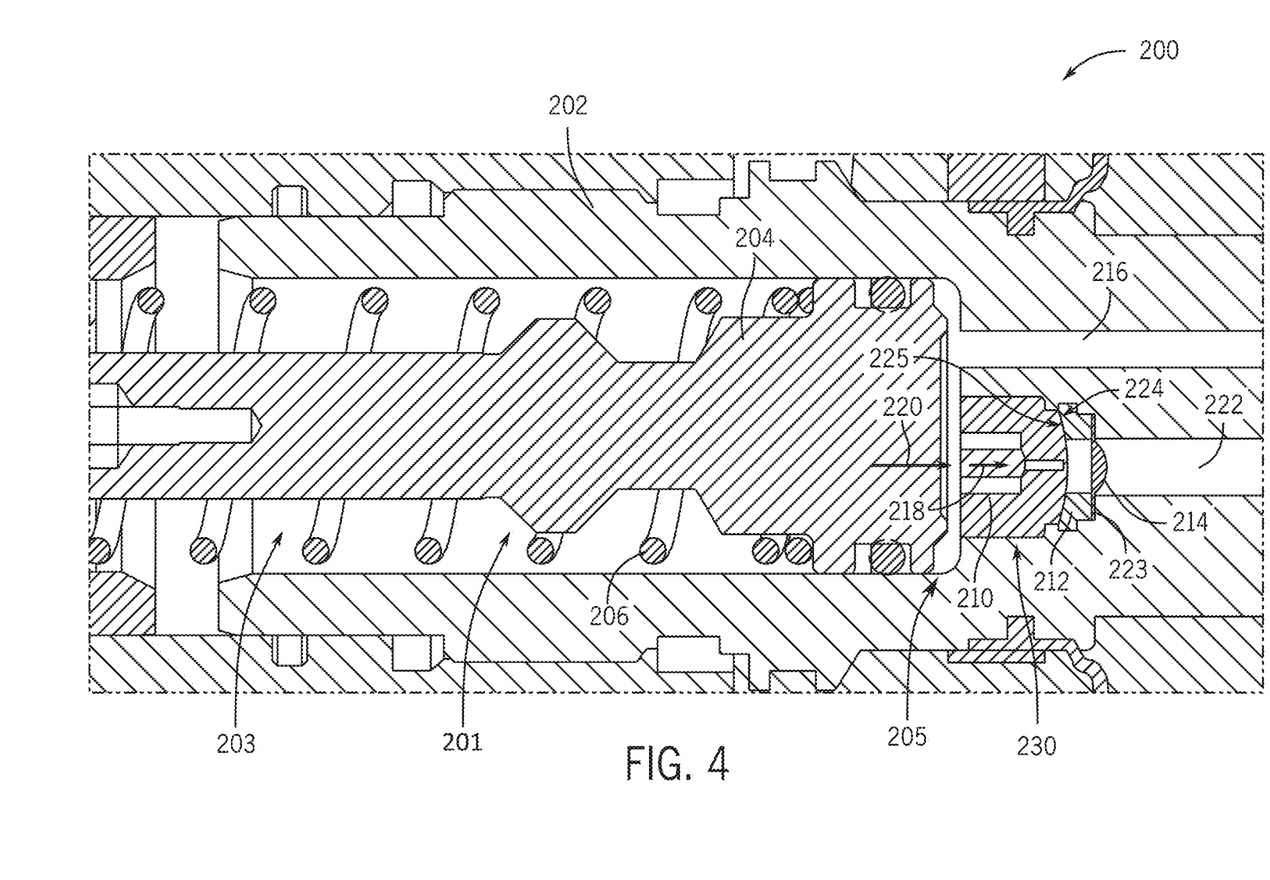
FIG. 4 is a cross-sectional view of a portion of the overload assembly according to another embodiment of the invention.

FIG. 4 illustrates an alternative embodiment where the overload assembly 200 is located in the manifold 202 proximate to the back portion 205 of the ram chamber 201. More particularly, the overload assembly 200 is located along a portion of a hydraulic fluid path that defines a fluid outlet 222 through which the ram chamber 201 is in fluid communication with another location, such as a fluid reservoir of the hydraulic tool. To facilitate this, a portion of the manifold 202 along the hydraulic fluid path (and, in this particular arrangement, along the portion of the hydraulic fluid path that defines the fluid outlet 222) can be configured (e.g., machined) to include a bore 230 or other type of cavity that houses the overload assembly 200. As shown, the burst disc 214 can be sealed against a mounting surface 223 of the manifold 202 at one end of the cavity (i.e., opposite the other end of the cavity that is located closer to the back portion of the ram chamber 201).

In operation of a hydraulic tool that includes the overload assembly 200 shown in FIG. 4, hydraulic fluid passes through the fluid inlet 216 and creates hydraulic pressure at the back portion 205 of the ram chamber 201, creating the hydraulic pressure reaction force 220 in the ram chamber 201, which acts on the lock nut 210. Further, the supporting force 218 acts on the burst disc 214 (i.e., by being transmitted by the spacer 212) in the same direction as the hydraulic pressure reaction force 220. Since both the supporting force 218 and the hydraulic pressure reaction force 220 are acting in the same direction, the two forces are additive and both act on the burst disc 214. Thus, both forces work to seal the burst disc 214 against mounting surface 223 of the ram cavity 208.

There are other perceived disadvantages of using known hydraulic tools as well, such as known hydraulic tools that include the overload assembly 100 of FIG. 1 or similar overload assemblies. For example, in some known overload assemblies, such as the overload assembly 100 of FIG. 1, the lock nut 104 and the spacer 106 are typically selected so that the surfaces of the lock nut 104 and the spacer 106 that are in contact with each other are flat or substantially flat. In this arrangement, however, the lock nut 104 and the spacer 106 can become misaligned, such as when the contacting surfaces are not machined to a desired degree (e.g., a gap exists between the lock nut 104 and the spacer 106 at one or more locations across their contacting surface areas) and/or when one or both components are displaced due to movement during normal operation of the hydraulic tool. This misalignment can, in turn, create or increase a radial imbalance in the sealing force on the burst disc 108, in which case the burst disc 108 might not be held down properly enough against the manifold 102 to sufficiently keep the burst disc 108 sealed in place.

Figure 5:
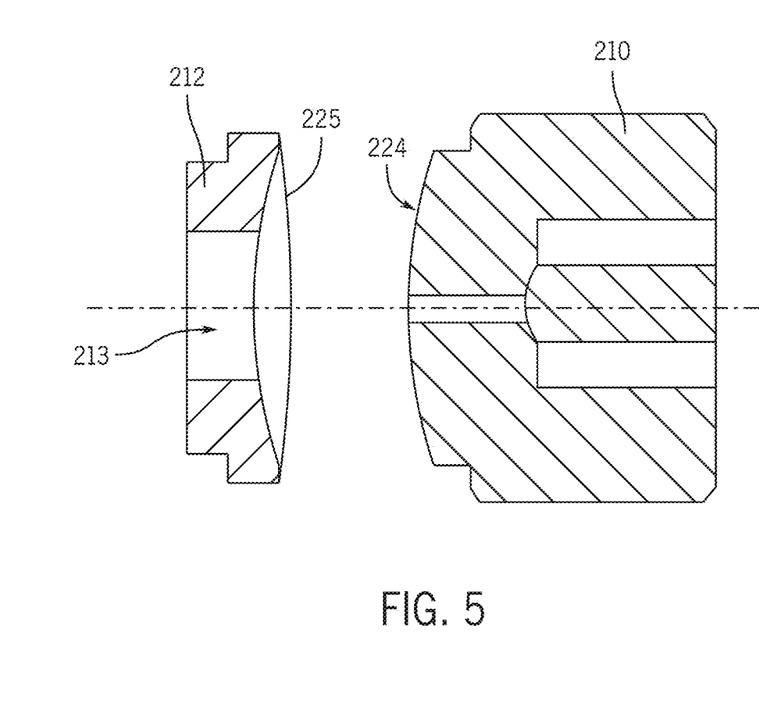
FIG. 5 is an exploded cross-sectional view of a portion of the overload assembly of FIG. 4.

In some embodiments of the invention, the lock nut 210 and the spacer 212 of the overload assembly 200 can be configured to help self-align during operation of the hydraulic tool. To facilitate this, each of the lock nut 210 and the spacer 212 can have radially-contoured surfaces 224, 225 that allow the overload assembly 200 to compensate for misalignment that might result during operation of the hydraulic tool or for other reasons. For example, as shown in FIG. 2, and as similarly shown in FIGS. 3, 4, and 5, a surface 224 of the lock nut 210 can be a convex radial surface and a surface 225 of the spacer 212 can be a concave radial surface. In some embodiments, surface 224 and surface 225 can be contoured so that a radius of surface 224 substantially matches a radius of surface 225, which can help promote alignment between the two surfaces so that they have substantially matching contours. Alternative configurations of surface 224 and/or surface 225 are possible as well. For example, surface 225 can be a conical surface instead of a concave radial surface. As another example, surface 224 can be a concave radial surface and surface 225 can be a convex radial surface.

In these embodiments, a substantially constant force can be maintained against the burst disc 214, preventing or reducing force on the burst disc 214 and keeping the burst disc 214 (i.e., the peripheral flange 215 of the burst disc 214) in place flat against the surface to which it is mounted (i.e., mounting surface 221).

Figure 6:
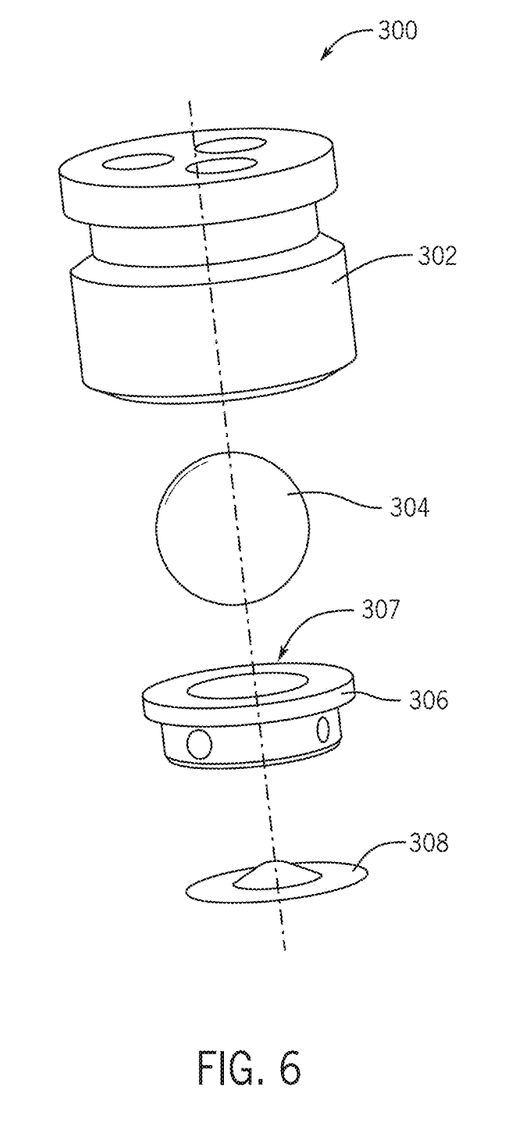
FIG. 6 is an exploded perspective view of an overload assembly according to another embodiment of the invention.
Figure 7:
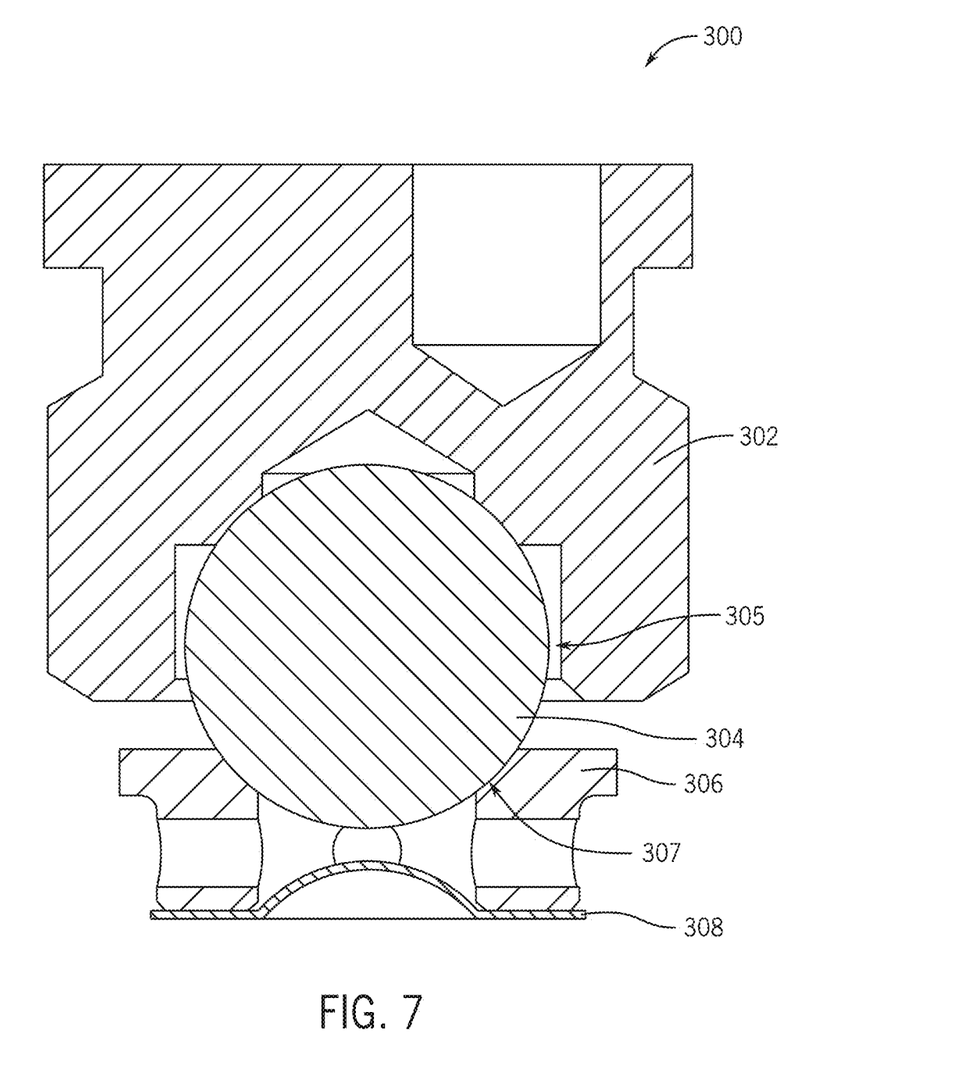
FIG. 7 is a cross-sectional view of the overload assembly of FIG. 6.

FIG. 6 illustrates an exploded view of an overload assembly 300 according to another embodiment of the invention, and FIG. 7 illustrates a cross-sectional view of the overload assembly 300. In particular, the overload assembly 300 includes a lock cap 302, a ball 304, a spacer 306, and a burst disc 308.

The lock cap 302 can be configured to lock the overload assembly 300 in a manifold (e.g., the ram cavity 208) and to provide a force on the ball 304. The lock cap 302 can include a recess 305 at one end of the lock cap 302, where the recess 305 is configured to house at least a portion of the ball 304. The recess 305 can be contoured to substantially match a contour of the ball 304.

The lock cap 302 can be made of metal or another material. In alternative embodiments, the lock cap 302 can take the form of a lock nut that is threaded to another surface (e.g., to the manifold 102 or to the ram cavity 208), such as lock nut 210 of FIG. 2.

The ball 304 can be a spherical object made of metal or another material. The ball 304 can be configured to support radial and/or axial loads and transfer loads from the lock cap 302 to the spacer 306. The ball 304 can act as a universal joint for alignment of the overload assembly 300.

In alternative embodiments, the lock cap 302 and the ball 304 can be integrated together by machining a sphere on a bottom end of the lock cap 302. In these embodiments, the bottom end of the lock cap 302 can include a spherical protrusion configured to contact the spacer 306 and transfer loads from the lock cap 302 to the spacer 306, and the spacer 306 can include a recess 307 that is contoured to substantially match a contour of the spherical protrusion.

The spacer 306 can be configured to house at least a portion of the ball 304 so that the spacer 306 receives the load from the ball 304. For example, the spacer 306 can include a recess 307 that is contoured to substantially match a contour of the ball 304. Further, the spacer 306 can be configured to serve the same or similar purpose as the spacer 212 of FIG. 2 (i.e., to transfer forces to the burst disc 308 and to provide a leak path when the burst disc 308 is ruptured). The burst disc 308 can take the same or similar form and serve the same or similar purpose as the burst disc 214 of FIG. 2.

With the arrangement of the overload assembly 300, the ball 304 helps maintain a substantially balanced force against the spacer 306 (and thus, against the burst disc 308) during operation of the hydraulic tool, improving the effectiveness of the seal of the burst disc 308 (e.g., keeping the peripheral flange 215 of the burst disc 308 in place flat against mounting surface 221 of FIG. 2, or mounting surface 223 of FIG. 4). Furthermore, the overload assembly 300 (and, likewise, the embodiments having the concave/convex/etc. surfaces described above) can be cheaper and easier to manufacture.

By the term "substantially" or "about" used herein, it is meant that the recited characteristic, parameter, value, or geometric planarity need not be achieved exactly, but that deviations or variations, including for example, tolerances, measurement error, measurement accuracy limitations and other factors known in the art, may occur in amounts that do not preclude the effect the characteristic was intended to provide.

The description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An overload assembly for use in a ram cavity of a ram piston of a hydraulic tool, the ram cavity including a first end and a second end opposite the first end, the overload assembly comprising:
   a burst disc positioned at the first end of the ram cavity;
   a lock nut positioned at the second end of the ram cavity, the lock nut receiving from the ram piston a hydraulic pressure reaction force acting in a first direction, the lock nut receiving a supporting force acting in the first direction; and
   a spacer positioned between the burst disc and the lock nut.

2. The overload assembly of claim 1, wherein the spacer transfers the supporting force applied from the lock nut to the burst disc.

3. The overload assembly of claim 1, and further comprising a ball positioned between the lock nut and the spacer.

4. The overload assembly of claim 1, wherein the burst disc includes a radially extending peripheral flange that contacts a mounting surface of the first end.

5. The overload assembly of claim 1, wherein the lock nut is threaded to the second end of the ram cavity and the supporting force is generated by torqueing the lock nut.

6. The overload assembly of claim 1, wherein the spacer includes a concave radial surface and the lock nut includes a convex radial surface,
   the concave radial surface being in contact with the convex radial surface and having matching contours.

7. The overload assembly of claim 1, and further comprising a lock cap to lock the overload assembly in a manifold.

8. The overload assembly of claim 1, wherein the spacer supplies a leak path when the burst disc is ruptured.

9. A hydraulic tool comprising:
   a manifold including a ram chamber that receives a pressurized hydraulic fluid;
   a ram assembly having a ram piston, the ram piston receiving a hydraulic pressure reaction force, the ram piston including a ram cavity within at least a portion of the ram chamber, the ram cavity including a mounting surface;
   a burst disc sealed against the mounting surface;
   a lock nut that receives the hydraulic pressure reaction force and a supporting force acting in a same direction as the hydraulic pressure reaction force; and
   a spacer positioned between the burst disc and the lock nut to transfer the supporting force from the lock nut to the burst disc.

10. The hydraulic tool of claim 9, wherein the hydraulic pressure reaction force results from the pressurized hydraulic fluid pushing on the ram piston during operation of the hydraulic tool.

11. The hydraulic tool of claim 9, and further comprising a hydraulic fluid passage circuit to hydraulically drive the hydraulic tool; and a fluid inlet in fluid communication with the hydraulic fluid passage circuit.

12. The hydraulic tool of claim 9, wherein a spring surrounds an outer surface of the ram piston.

13. The hydraulic tool of claim 9, wherein the lock nut and the spacer have radially-contoured surfaces to self-align during operation.

14. The hydraulic tool of claim 9, wherein the lock nut is threaded to the ram cavity.

15. A ram assembly for a hydraulic tool, the ram assembly comprising:
   a ram piston that receives a hydraulic pressure reaction force, the ram piston having a ram cavity; and
   an overload assembly in the ram cavity, the overload assembly including:
   a burst disc;
   a lock nut that receives a supporting force, the hydraulic pressure reaction force and the supporting force acting in a same direction; and
   a spacer positioned between the burst disc and the lock nut.

16. The ram assembly of claim 15, wherein the spacer transfers the supporting force from the lock nut to the burst disc.

17. The ram assembly of claim 15, wherein the burst disc includes a peripheral flange that seals the burst disc against the ram cavity.

18. The ram assembly of claim 15, wherein the spacer includes a concave radial surface and the lock nut includes a convex radial surface.

19. The ram assembly of claim 15, wherein the overload assembly is housed within the ram piston.

20. The ram assembly of claim 15, and further comprising a spring that surrounds an outer surface of the ram piston.

* * * * *